United States Patent
Toens et al.

(10) Patent No.: US 10,027,263 B2
(45) Date of Patent: Jul. 17, 2018

(54) METHOD FOR DETECTING A FAULT IN A MOTOR ARRANGEMENT WITH AN ELECTRICAL MACHINE AND MOTOR CONTROL UNIT

(71) Applicant: Continental Automotive GmbH, Hannover (DE)

(72) Inventors: Matthias Toens, Regensburg (DE); Thomas Baumann, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 121 days.

(21) Appl. No.: 14/418,153

(22) PCT Filed: Jul. 23, 2013

(86) PCT No.: PCT/EP2013/065464
§ 371 (c)(1),
(2) Date: Jan. 29, 2015

(87) PCT Pub. No.: WO2014/019882
PCT Pub. Date: Feb. 6, 2014

(65) Prior Publication Data
US 2015/0263654 A1    Sep. 17, 2015

(30) Foreign Application Priority Data
Aug. 2, 2012 (DE) ........................ 10 2012 213 709

(51) Int. Cl.
*G05B 9/02* (2006.01)
*H02P 6/12* (2006.01)
(Continued)

(52) U.S. Cl.
CPC .................. *H02P 6/12* (2013.01); *H02P 6/16* (2013.01); *H02P 29/0241* (2016.02)

(58) Field of Classification Search
USPC ...... 318/563, 400.21, 400.22, 706, 707, 782
See application file for complete search history.

(56) References Cited

U.S. PATENT DOCUMENTS 5,598,077 A * 1/1997 Matsubara ........... G05B 19/404
318/568.22
6,047,679 A * 4/2000 Matsumoto ........... F02D 11/107
123/396
(Continued)

FOREIGN PATENT DOCUMENTS

CN    1719270 A    1/2006    ............. G01D 18/00
CN    101171497 A    4/2008    ............. G01D 5/244
(Continued)

OTHER PUBLICATIONS

Chinese Office Action, Application No. 201380051752.4, 18 pages, dated Mar. 29, 2016.
(Continued)

*Primary Examiner* — Jorge L Carrasquillo
(74) *Attorney, Agent, or Firm* — Slayden Grubert Beard PLLC (57) ABSTRACT

A method for detecting a fault in an electrical machine, e.g., a synchronous motor, a motor control unit for controlling an electrical machine, and a motor arrangement having such a motor control unit are disclosed. According to the method, rotation angle data are determined, which data are dependent on a rotation angle of a rotor of the electrical machine in the absence of the fault. In addition, additional data are determined and allow conclusions to be drawn on the fault. A fault is detected if the rotation angle data satisfy a first criterion and the additional data satisfy a second criterion.

11 Claims, 4 Drawing Sheets

(51) Int. Cl.
*H02P 6/16* (2016.01)
*H02P 29/024* (2016.01)

(56) References Cited

U.S. PATENT DOCUMENTS

| | | | | |
|---|---|---|---|---|
| 6,577,957 | B2 | 6/2003 | Fujimoto et al. | 702/36 |
| 6,958,620 | B1 * | 10/2005 | Kozuki | G01D 5/2006 |
| | | | | 324/765.01 |
| 7,369,345 | B1 * | 5/2008 | Li | G11B 5/5582 |
| | | | | 360/73.03 |
| 7,385,365 | B2 | 6/2008 | Feick | 318/400.01 |
| 7,443,118 | B2 | 10/2008 | Kro | 318/254.1 |
| 7,538,700 | B2 | 5/2009 | Nagamoto | 341/115 |
| 7,737,652 | B2 | 6/2010 | Schwesig | 318/432 |
| 8,547,047 | B2 | 10/2013 | Bonin et al. | 318/611 |
| 2003/0057011 | A1 * | 3/2003 | Ito | B62D 5/049 |
| | | | | 180/446 |
| 2004/0171459 | A1 * | 9/2004 | Luft | F16H 59/24 |
| | | | | 477/121 |
| 2011/0187358 | A1 * | 8/2011 | Eutebach | G01D 5/204 |
| | | | | 324/207.25 |
| 2012/0210791 | A1 * | 8/2012 | Pannek | B62D 6/10 |
| | | | | 73/514.02 |

FOREIGN PATENT DOCUMENTS

| | | | | |
|---|---|---|---|---|
| DE | 3931143 | A1 | 3/1991 | G05B 19/4063 |
| DE | 10210372 | A1 | 9/2003 | G01D 5/14 |
| DE | 10152427 | A1 | 10/2004 | B62D 15/02 |
| DE | 102005012779 | A1 | 10/2005 | H02P 6/12 |
| DE | 102004019284 | A1 | 11/2005 | H02P 6/12 |
| DE | 102006042038 | B3 | 2/2008 | H02P 21/00 |
| DE | 102008024527 | A1 | 11/2009 | G01B 7/30 |
| DE | 102010024238 | A1 | 12/2011 | B25J 9/16 |
| DE | 102010024688 | A1 | 12/2011 | H02P 29/02 |
| DE | 102010053098 | A1 * | 6/2012 | G05B 23/0243 |
| EP | 1291263 | A2 | 3/2003 | B62D 5/04 |
| EP | 1479157 | B1 | 12/2006 | H02P 21/00 |
| JP | 2009270978 | A | 11/2009 | B66B 3/01 |
| JP | 2010029030 | A | 2/2010 | B62D 5/04 |
| WO | 2014/019882 | A1 | 2/2014 | G01D 5/244 |

OTHER PUBLICATIONS

International Search Report and Written Opinion, Application No. PCT/EP2013/065464, 25 pages, dated Oct. 15, 2013.

* cited by examiner

METHOD FOR DETECTING A FAULT IN A MOTOR ARRANGEMENT WITH AN ELECTRICAL MACHINE AND MOTOR CONTROL UNIT

CROSS-REFERENCE TO RELATED APPLICATIONS

This application is a U.S. National Stage Application of International Application No. PCT/EP2013/065464 filed Jul. 23, 2013, which designates the United States of America, and claims priority to DE Application No. 10 2012 213 709.2 filed Aug. 2, 2012, the contents of which are hereby incorporated by reference in their entirety.

TECHNICAL FIELD

The present invention relates to a method for detecting a fault in a motor arrangement with an electrical machine, particularly a synchronous motor, and to a motor controller for controlling an electrical machine, particularly a synchronous motor, with a fault detection unit for detecting a fault in the motor arrangement. Furthermore, the invention relates to a motor arrangement with an electrical machine, particularly a synchronous motor, and a motor controller.

BACKGROUND

In modern motor vehicles, electrical machines, such as synchronous motors, are increasingly used as drive motors. In order to regulate the electrical machine, rotation angle sensors are frequently arranged on the electrical machine in electric or hybrid vehicles, said rotation angle sensors sensing the speed and the rotation angle of the rotor and of the electrical machine. Such a rotation angle sensor is known from DE 102 10 372 A1, for example.

By way of example, a rotation angle sensor may have a sensor element and a sensor disk, the sensor disk having a signal trace with a known shape. If the signal trace is sinusoidal, for example, then the rotation angle sensor delivers a sinusoidal signal. Usually, a rotation angle sensor with a sinusoidal signal trace has a further sensor element that is fitted at an interval of 90° with respect to the first sensor element and therefore delivers a cosine-shaped signal. For these two signals, i.e. the sine signal and the cosine signal, it is possible to calculate the rotation angle using the arctangent. The rotation angle of the rotor of the electrical machine may be needed particularly for field-oriented regulation of the electrical machine.

For safety reasons, the correct operation of the electrical machine needs to be monitored constantly. By way of example, EP 1 479 157 B1 discloses a method for fault detection for electric motors in the motor vehicle domain.

SUMMARY

One embodiment provides a method for detecting a fault in a motor arrangement with an electrical machine, particularly a synchronous motor, having the steps of: ascertainment of rotation angle data that, in the absence of the fault, are dependent on a rotation angle of a rotor of the electrical machine, ascertainment of additional data that allow the fault to be inferred, and detection of the fault when the rotation angle data meet a first criterion and the additional data meet a second criterion.

In a further embodiment, the first criterion is met when the rotation angle data essentially correspond to a predetermined rotation angle.

In a further embodiment, the method further includes the steps of checking whether the rotation angle data meet the first criterion, and, if the rotation angle data meet the first criterion, checking whether the rotation angle data are constant.

In a further embodiment, the step of ascertainment of additional data comprises the step of sensing of a torque requirement as additional data when the rotation angle data meet the first criterion.

In a further embodiment, the step of sensing a torque requirement is executed at least twice and the method additionally comprises the steps of determination of a maximum and a minimum torque requirement on the basis of the sensed torque requirements, calculation of a difference between the maximum and the minimum torque requirement, and checking whether the calculated difference meets the second criterion, particularly whether the calculated difference exceeds a predetermined difference threshold value.

In a further embodiment, the method includes the step of checking whether the rotation angle data meet the first criterion when the calculated difference meets the second criterion.

In a further embodiment, the step of ascertainment of additional data comprises the step of ascertainment of a speed of the electrical machine on the basis of the ascertained rotation angle data.

In a further embodiment, the step of ascertainment of a speed of the electrical machine comprises the steps of ascertainment of first rotation angle data, waiting for a predetermined first period of time, ascertainment of second rotation angle data, and ascertainment of the speed of the electrical machine on the basis of the first and second rotation angle data and also the predetermined first period of time.

In a further embodiment, the step of ascertainment of a speed is executed twice, as a result of which the step of ascertainment of additional data comprises the steps of ascertainment of a first speed, waiting for a predetermined second period of time, ascertainment of a second speed, ascertainment of a rate of change of the ascertained speeds as addition data on the basis of the first and second speeds and also the predetermined second period of time, and checking whether the ascertained rate of change meets the second criterion, particularly whether the ascertained rate of change exceeds a predetermined rate of change threshold value.

In a further embodiment, the fault detected is loss of a connection between a rotation angle sensor for ascertaining rotation angle data and a ground.

Another embodiment provides a motor controller for controlling an electrical machine, particularly a synchronous motor, in a motor arrangement, having: at least one input for receiving sensor signals for ascertaining rotation angle data that, in the absence of the fault, are dependent on a rotation angle of a rotor of the electrical machine, means for ascertaining additional data that allow a fault in the motor arrangement to be inferred, and a fault detection unit for detecting the fault when the rotation angle data meet a first criterion and the additional data meet a second criterion.

In a further embodiment, the motor controller includes a processing unit and a data memory, which contains a program that can be executed by a processing unit and that comprises instructions for executing the steps of the method as disclosed above.

Another embodiment provides a motor arrangement having an electrical machine, particularly a synchronous motor, that has a rotation angle sensor that is connected to a ground via a line, and a motor controller as disclosed above that is set up to detect loss of the connection between the rotation angle sensor and the ground.

BRIEF DESCRIPTION OF THE DRAWINGS

Example embodiments are explained below with reference to the figures, in which.

DETAILED DESCRIPTION

Embodiments of the present invention provide a method and an associated motor controller for detecting a fault in a motor arrangement with an electrical machine that are able to detect at least one fault inexpensively and reliably. A further object is to provide an associated motor arrangement.

Accordingly, one embodiment provides a method for detecting a fault in a motor arrangement with an electrical machine, particularly a synchronous motor, having the steps of ascertainment of rotation angle data that, in the absence of the fault, are dependent on a rotation angle of a rotor of the electrical machine, ascertainment of additional data that allow the fault to be inferred, and detection of the fault when the rotation angle data meet a first criterion and the additional data meet a second criterion.

In this case, the rotation angle data can meet the first criterion particularly when they essentially correspond to a predetermined rotation angle. If the sine and cosine paths of the rotation angle sensor and of the associated evaluation electronics on the motor controller are of identical design, the predetermined rotation angle may be 45°, for example.

If a rotation angle sensor of the electrical machine loses its connection to the ground, the rotation angle sensor still delivers sensor signals, which, although constant and independent of the rotation angle of the rotor, are nevertheless interpreted by a processing unit of the motor controller. The processing unit thus ascertains an angle that does not correspond to the rotation angle of the rotor but could nevertheless arise during normal operation of the electrical machine. When a characteristic angle appears that indicates possible loss of the connection between rotation angle sensor and ground, the ascertainment of additional data allows a check to be performed to determine whether the corresponding fault actually exists. Thus, the fault is established only when the rotation angle data meet a first criterion and the additional data meet a second criterion.

As already mentioned, electrical machines usually have a rotation angle sensor that provides sensor signals from which it is possible to derive a rotation angle of a rotor of the electrical machine. Accordingly, the step of ascertainment of rotation angle data may comprise the steps of measurement of a value of a sensor signal, the value of the sensor signal being indicative of the rotation angle, and calculation of the rotation angle on the basis of the measured value of the sensor signal in order to ascertain the rotation angle data.

As already described, the predetermined rotation angle also arises during normal operation without a fault. Accordingly, the disclosed method may have the steps of checking whether the rotation angle data meet the first criterion, and, if the rotation angle data meet the first criterion, checking whether the rotation angle data are constant. By way of example, when the predetermined rotation angle is detected, rotation angle data can be determined once again after a certain stipulated period of time in order to check whether they continue to correspond to the predetermined rotation angle.

In one embodiment, the step of ascertainment of additional data comprises the step of sensing of a torque requirement as additional data when the rotation angle data meet the first criterion. If the rotation angle data correspond to the predetermined rotation angle, for example, a check is thus performed to determine whether a torque requirement exists for the electrical machine. By way of example, such a torque requirement exists when the driver of the vehicle steps on the gas pedal.

In one embodiment, the step of sensing of a torque requirement is executed at least twice and the disclosed method additionally comprises the steps of determination of a maximum and a minimum torque requirement on the basis of the sensed torque requirements, calculation of a difference between the maximum and the minimum torque requirement, and checking whether the calculated difference meets the second criterion. In particular, it is possible to check whether the calculated difference exceeds a predetermined threshold value.

Preferably, when the calculated difference meets the second criterion, another check is performed to determine whether the rotation angle data still meet the first criterion. If the rotation angle data essentially correspond to the predetermined rotation angle, it is thus ascertained whether the driver of the motor vehicle is operating the gas pedal and whether this alters the rotation angle of the rotor of the electrical machine. If a torque requirement exists without the rotation angle of the rotor changing, the fault can be inferred. This is because such a case cannot arise with a working rotation angle sensor because the rotor would rotate sufficiently even in a firmly braked vehicle owing to the soft motor suspension in the vehicle.

In one embodiment, the step of ascertainment of additional data comprises the step of ascertainment of a speed of the electrical machine on the basis of the ascertained rotation angle data.

The step of ascertainment of a speed of the electrical machine may comprise particularly the steps of ascertainment of first rotation angle data, waiting for a predetermined first period of time, ascertainment of second rotation angle data and ascertainment of the speed of the electrical machine on the basis of the first and second rotation angle data and also the predetermined first period of time.

In this way, the rotation angle sensor can also be reused for ascertaining a speed of the electrical machine.

In one embodiment, the step of ascertainment of a speed is executed twice, so that the step of ascertainment of additional data comprises the steps of ascertainment of a first speed, waiting for a predetermined second period of time, ascertainment of a second speed and ascertainment of a rate of change of the ascertained speeds as additional data on the basis of the first and second speeds and also the predetermined second period of time. A check is then performed to determine whether the ascertained rate of change meets the second criterion. In particular, it is possible to check whether the ascertained rate of change exceeds a predetermined rate of change threshold value.

If the fault occurs while traveling, the measured speed would change suddenly. If the rotation angle data then change such that they meet the first criterion, it is possible to infer the existence of the fault. Preferably, following a sudden change in the speed, the method thus undergoes the step of checking whether the rotation angle data meet the first criterion, and, if the rotation angle data meet the first criterion, checking whether the rotation angle data are constant. If the rotation angle data meet the first criterion and the additional data meet the second criterion, the fault is detected.

Using the disclosed method, the fault detected may be loss of a connection between a rotation angle sensor for ascertaining rotation angle data and a ground.

Another embodiment provides a motor controller for controlling an electrical machine, particularly a synchronous motor, in a motor arrangement. Said motor controller has at least one input for receiving sensor signals for ascertaining rotation angle data that, in the absence of the fault, are dependent on a rotation angle of a rotor of the electrical machine. In addition, the motor controller comprises means for ascertaining additional data that allow a fault in the motor arrangement to be inferred, and a fault detection unit for detecting the fault when the rotation angle data meet a first criterion and the additional data meet a second criterion.

The motor controller can have a processing unit and a data memory, which contains a program that can be executed by the processing unit and that comprises instructions for executing the disclosed method.

Another embodiment provides a motor arrangement having an electrical machine, particularly a synchronous motor, that has a rotation angle sensor that is connected to a ground via a line, and also having a controller configured to detect loss of the connection between the rotation angle sensor and the ground.

Figure 1:
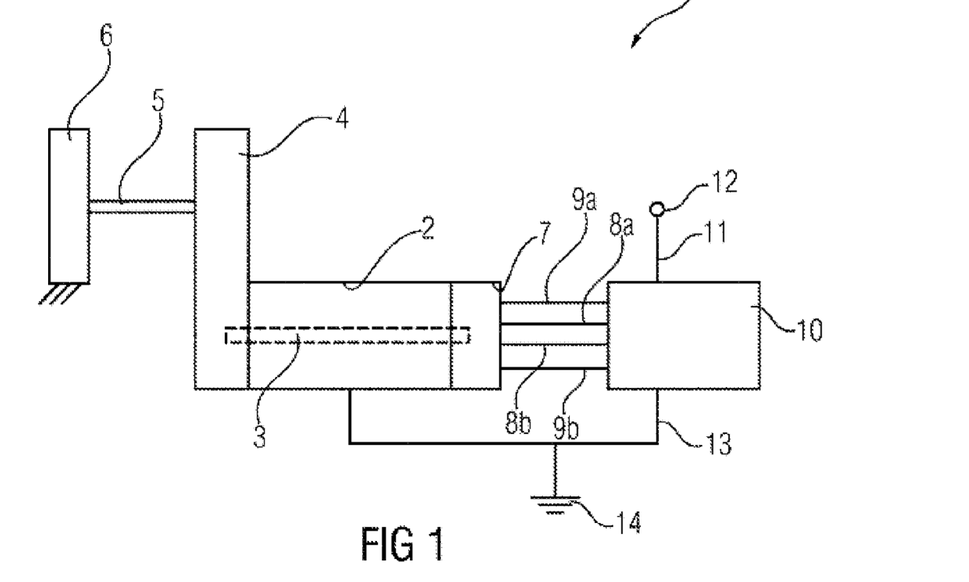
FIG. 1 shows a motor arrangement based on the prior art.

FIG. 1 shows a motor arrangement 1 based on the prior art. Said motor arrangement has an electrical machine 2, the rotor—not shown—of which is connected to the shaft 3 so as to resist torsion. The shaft 3 drives the drive train 4. The latter may have a gearbox, a clutch, an internal combustion engine and ancillary units, for example. The torque produced by the electrical machine 2 is transmitted from the drive train 4 to wheels of the motor vehicle via a respective axle shaft. For the purpose of simplification, only one axle shaft 5 and one wheel 6 are shown by way of example.

The electrical machine 2 has a rotation angle sensor 7 that is connected to the shaft 3 and that transmits its sensor signals to a motor controller 10 via two lines 8a, 8b. In this case, the line 8a is used to transmit the sine signal and the line 8b is used to transmit the cosine signal.

The line 11 is used to supply the motor controller 10 with a supply voltage 12. The ground line 13 connects the electrical machine 2 and the motor controller 10 to the ground 14. The line 9a is used to supply the rotation angle sensor 7 with a voltage from the motor controller 10, and the line 9b is used for the rotation angle sensor 7 as a ground connection.

If the line 9b in this motor arrangement 1 based on the prior art fractures and the rotation angle sensor 7 no longer has a connection to the ground, this line interruption is not detected. If the circuits for evaluating the sine signal and the cosine signal are each of identical design, the motor controller 10 assumes that the rotation angle of the rotor of the electrical machine 2 is 45°, since the voltages that are transmitted on the lines 8a and 8b are each of the same magnitude. As FIG. 2 shows, the point at which the voltages of the sine signal and the cosine signal are of the same magnitude is considered to be an angle of 45°, however.

Figure 2:
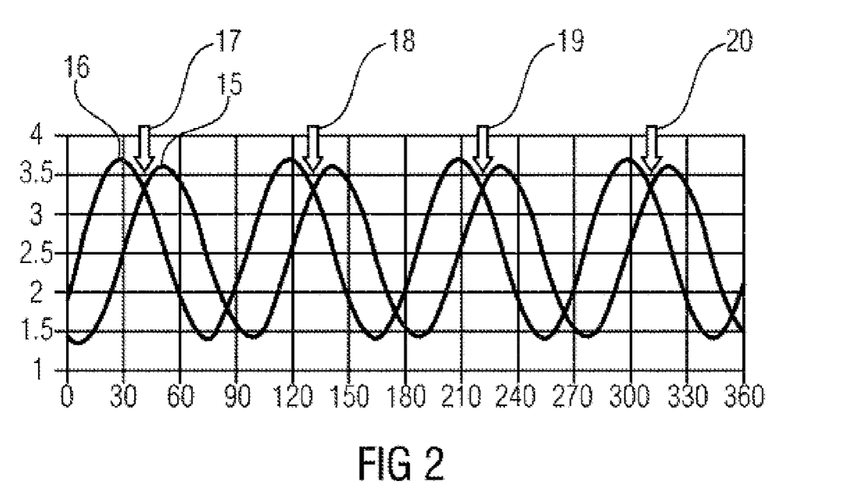
FIG. 2 shows a signal profile for the signals of an embodiment of a rotation angle sensor.

FIG. 2 illustrates this relationship. The ordinate axis plots the voltage values of the sine signal 15 and the cosine signal 16. The abscissa axis shows the rotation angle of the rotor. As illustrated by the arrows 17 to 20, the voltage values of the sine signal 15 and the cosine signal 16 are each of the same magnitude for a rotation angle of the rotor of 45° plus 90° times x, where x is a natural number. This is a special case, however, and may be totally different for other embodiments of a rotation angle sensor. In the present example, the voltage value at the points of intersection is approximately 3.3 volts.

A state in which the voltage values of the sine signal 15 and the cosine signal 16 are of the same magnitude is therefore regularly encountered when the rotor is rotating. Even when the vehicle is stationary, e.g. on a hill, such a state can arise over a relatively long time, which means that it is not a simple matter to detect loss of a connection to the ground.

Figure 3:
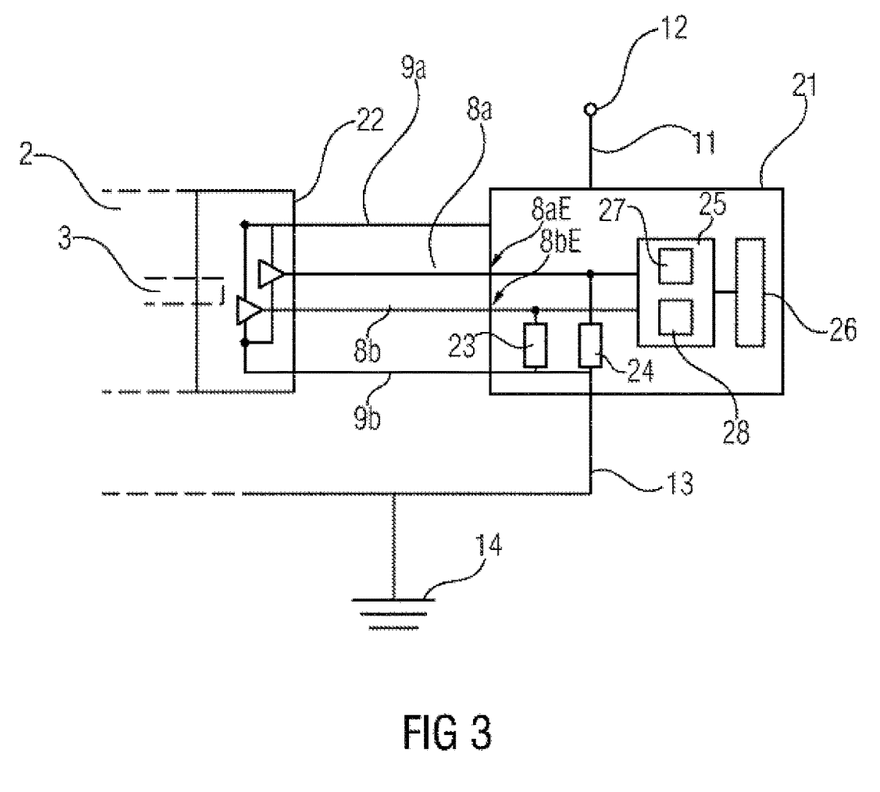
FIG. 3 shows a motor controller according to one embodiment in interaction with a rotation angle sensor.

FIG. 3 shows an embodiment of a motor controller 21 according to one embodiment with a rotation angle sensor 22. The motor controller 12 comprises a first input 8aE for receiving the sine signal and a second input 8bE for receiving the cosine signal. From the sine and cosine signals, it is possible to ascertain rotation angle data that, in the absence of the fault, are dependent on a rotation angle of the rotor of the electrical machine. The motor controller 21 is supplied with a supply voltage 12 via the line 11 and is connected to the ground 14 via the ground line 13. The rotation angle sensor 22 is supplied with a voltage by the motor controller 21 via the line 9a and is connected to ground via the line 9b. The rotation angle sensor 22 uses a first line 8a to transmit a sine signal and uses a second line 8b to transmit a cosine signal to the motor controller 21. The first and second lines 8a and 8b are connected to the ground line 13 via a first resistor 23 and a second resistor 24. The voltage drop across the first and second resistors 23, 24 is evaluated by a processing unit 25 of the motor controller. For this, the processing unit executes a program that is stored in a data memory 26. The processing unit 25 comprises means for ascertaining additional data, 27, that allow a fault in the motor arrangement to be inferred. By way of example, these means 27 may comprise program components or also an input for receiving one or more torque requirements as additional data. Furthermore, the processing unit 25 comprises a fault detection unit 28 for detecting the fault when the rotation angle data meet a first criterion and the additional data meet a second criterion.

For reasons of simple illustration, FIG. 1 does not show power electronics and the relevant connections between the motor controller 10 and the electrical machine 2. These are familiar to a person skilled in the art and are not changed by the present invention.

Figure 4:
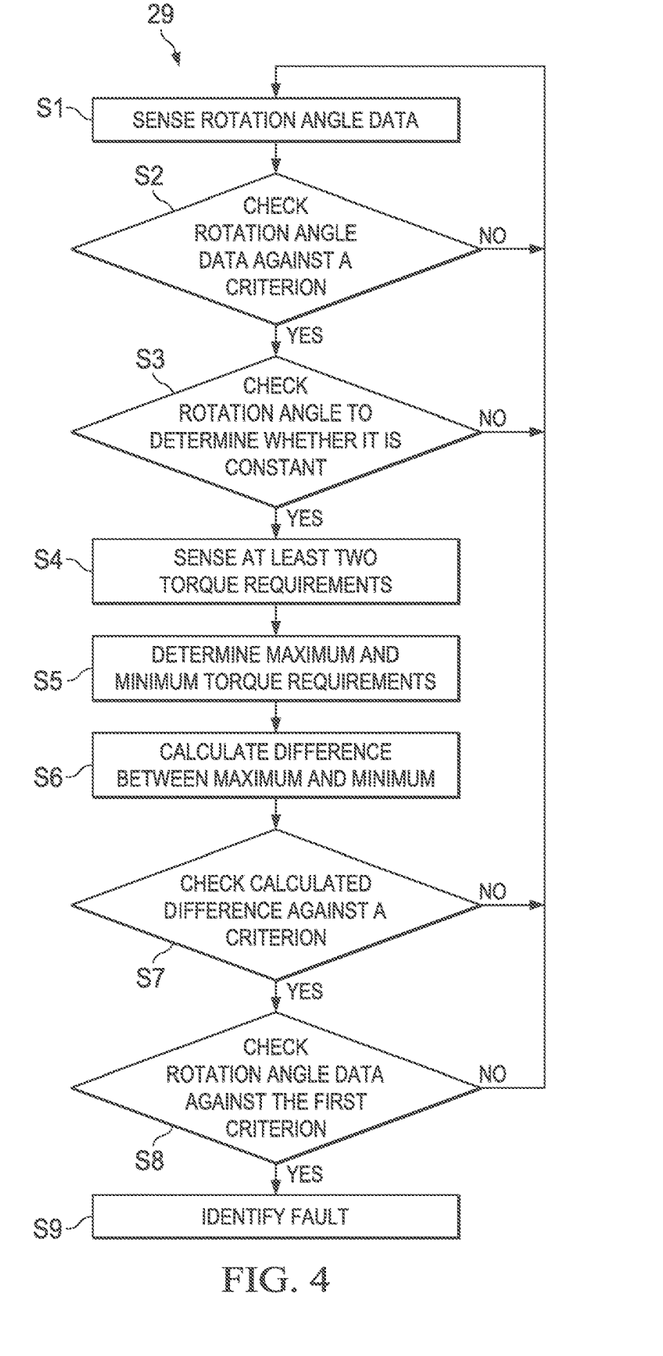
FIG. 4 shows a first embodiment of a method according to one embodiment.

FIG. 4 illustrates a first embodiment 29 of a method according to one embodiment for detecting a fault in an electrical machine. In step S1, rotation angle data are ascertained that, in the absence of the fault, are dependent on a rotation angle of the rotor of the electrical machine. In the subsequent step S2, a check is then performed to determine whether the rotation angle data ascertained in step S1 meet the first criterion. By way of example, the first criterion may be met when, given the same dimensioning of the first and second resistors 23, 24, a rotation angle of essentially 45° appears. If the first criterion is met by the rotation angle data, the process branches to step S3. Otherwise, it returns to step S1. In step S3, a check is performed to determine whether the rotation angle data are constant. By way of example, this can be accomplished by waiting for a predetermined period of time and then ascertaining up-to-date rotation angle data once again. If the rotation angle data are constant, the process continues with step S4. Otherwise, it returns to step S1.

In step S4, at least two torque requirements are sensed as additional data. Within the sensed torque requirements, a maximum and a minimum torque requirement are determined in step S5. In step S6, a difference between the maximum and minimum torque requirements is calculated. Next, in step S7, a check is performed to determine whether the calculated difference meets the second criterion. In the present example, the second criterion is met when the calculated difference exceeds a predetermined difference threshold value. If the second criterion is met by the calculated difference, the process continues with step S8. Otherwise, it returns to step S1.

In step S8, a check is performed to determine whether the rotation angle data still meet the first criterion. For this, it is naturally necessary for the rotation angle data to be ascertained once again. If the rotation angle data still meet the first criterion, the process branches to step S9, in which the fault is detected. Otherwise, it returns to step S1.

Figure 5:
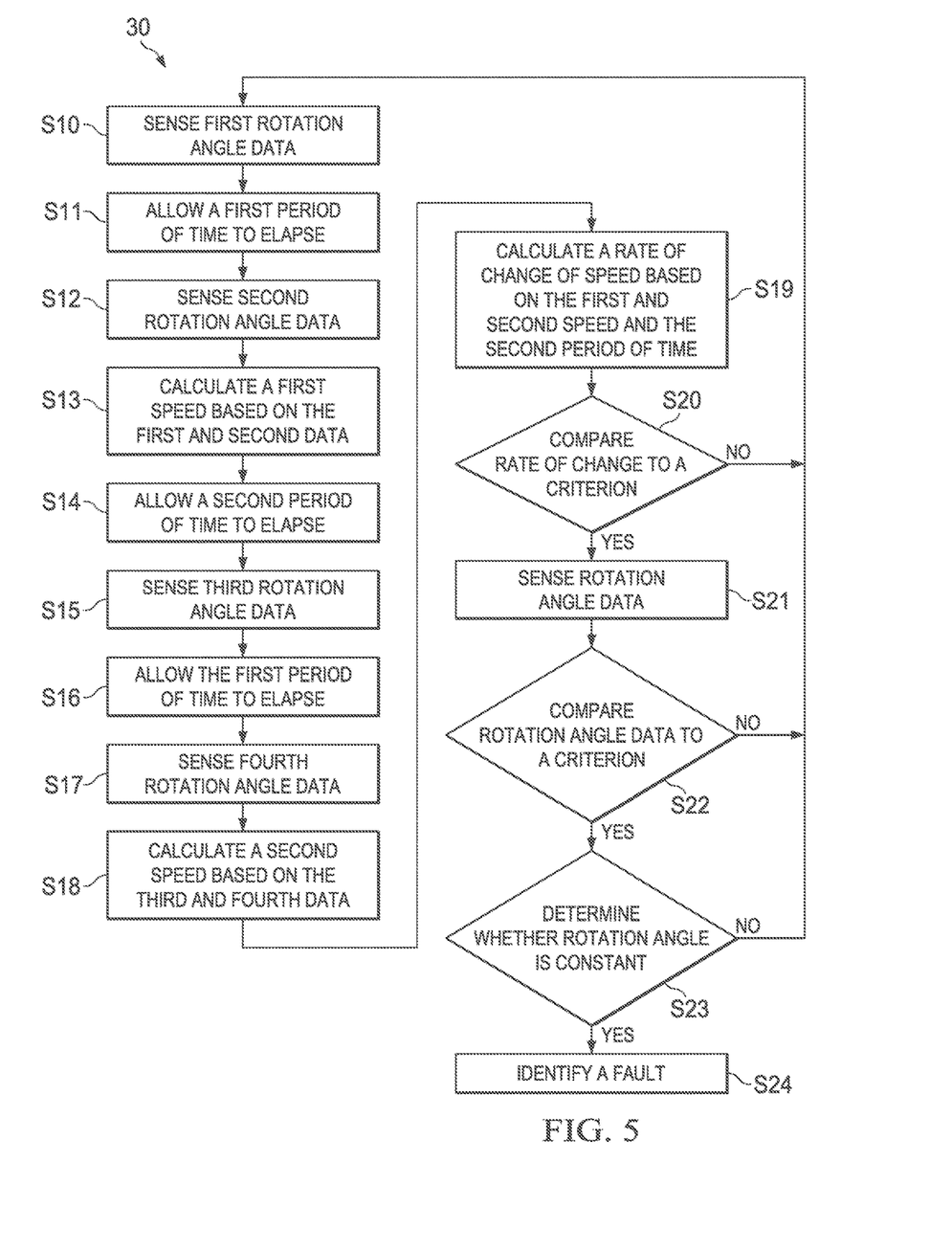
FIG. 5 shows a second embodiment of a method according to one embodiment.

FIG. 5 illustrates a second embodiment 30 of the method according to one embodiment for detecting a fault in a motor arrangement with an electrical machine. In step S10, first rotation angle data are ascertained. In step S11, the process waits for a predetermined first period of time before second rotation angle data are ascertained in step S12. On the basis of the first and second rotation angle data and the predetermined first period of time, a first speed of the electrical machine is determined in step S13.

In step S14, the process then waits for a predetermined second period of time. Third rotation angle data are then determined in step S15. In step S16, the process then again waits for a predetermined first period of time before fourth rotation angle data are ascertained in step S17. On the basis of the third and fourth rotation angle data and the predetermined first period of time, a second speed is then determined in step S18. In step S19, the first and second speeds and the predetermined second period of time are then taken as a basis for ascertaining a rate of change of the ascertained speeds as additional data.

In step S20, a check is performed to determine whether the ascertained rate of change meets the second criterion. In the present example, a check is performed to determine whether the ascertained rate of change exceeds a predetermined rate of change threshold value. If this is the case, the process branches to step S21. Otherwise, it returns to step S10. In step S21, rotation angle data are again ascertained. In step S22, a check is performed to determine whether the rotation angle data ascertained in step S21 meet the first criterion. In the example shown, a check is performed to determine whether the rotation angle data essentially correspond to a predetermined rotation angle, e.g. 45°. Should this be the case, the process branches to step S23. Otherwise, it returns to step S10. In step S23, a check is then performed to determine whether the rotation angle data are constant. By way of example, this can be accomplished by waiting for a predetermined period of time, then determining the rotation angle data once again and subsequently deciding whether said rotation angle data still meet the first criterion. Should the rotation angle data be constant, the process branches to step S24, in which the fault is detected. Otherwise, it returns to step S10.

While the first embodiment 29 is suitable particularly for a stationary vehicle, the second embodiment 30 can be used for a traveling vehicle, in particular. The present invention allows rapid detection of the loss of a connection between the rotation angle sensor and the ground. This requires no additional hardware that monitors the sensor supply current. Instead, the method can be implemented as a pure software extension.

The explanations provided with reference to the figures are intended to be understood as purely illustrative and nonlimiting. Many amendments can be made to the embodiments described without departing from the scope of protection of the invention as set out in the appended claims. The features of the embodiments can be combined with one another so as to provide further embodiments optimized for the instance of application.

LIST OF REFERENCE SYMBOLS

1 Motor arrangement
2 Electrical machine
3 Shaft
4 Drive train
5 Axle shaft
6 Wheel
7 Rotation angle sensor
8a Line for transmitting the sine signal
8aE Input for receiving sensor signals
8b Line for transmitting the cosine signal
8bE Input for receiving sensor signals
9a Line for supplying the rotation angle sensor with voltage
9b Ground connection of the rotation angle sensor
10 Motor controller
11 Line
12 Supply voltage
13 Ground line
14 Ground
15 Sine signal
16 Cosine signal
17-20 Points of intersection between sine signal and cosine signal
21 Motor controller
22 Rotation angle sensor
23 First resistor
24 Second resistor
25 Processing unit
26 Data memory
27 Means for ascertaining additional data
28 Fault detection unit
29 First embodiment of a method according to the invention
30 Second embodiment of the method according to the invention
S1 Ascertainment of rotation angle data
S2 Check to determine whether the rotation angle data meet the first criterion
S3 Check to determine whether the rotation angle data are constant
S4 Sensing of at least two torque requirements
S5 Determination of a maximum and a minimum torque requirement
S6 Calculation of a difference between the maximum and minimum torque requirements
S7 Check to determine whether the calculated difference meets the second criterion S8 Check to determine whether the rotation angle data meet the first criterion
S9 Detection of the fault
S10 Ascertainment of first rotation angle data
S11 Wait for a predetermined first period of time
S12 Ascertainment of second rotation angle data
S13 Ascertainment of a first speed of the electrical machine
S14 Wait for a predetermined second period of time
S15 Ascertainment of third rotation angle data
S16 Wait for a predetermined first period of time
S17 Ascertainment of fourth rotation angle data
S18 Ascertainment of a second speed
S19 Ascertainment of a rate of change of the ascertained speeds as additional data
S20 Check to determine whether the ascertained rate of change meets the second criterion
S21 Ascertainment of rotation angle data
S22 Check to determine whether the rotation angle data meet the first criterion
S23 Check to determine whether the rotation angle data are constant
S24 Detection of the fault

What is claimed is:

1. A method for controlling an electrical machine, the method comprising:
sensing a first signal associated with rotation of a rotor of the electrical machine;
calculating a rotation angle of the rotor based at least in part on the first signal;
if the calculated rotation angle is 45 degrees, analyzing a second signal for a potential fault in the first signal;
wherein the second signal comprises data related to a torque requirement for operation of the electrical machine;
identifying the potential fault as an actual fault upon a determination that a value of the second signal meets a fault criterion; and
if an actual fault is identified, operating the electrical machine independently of the value of the first signal;
sensing the second signal at least at two different times,
determining a maximum and a minimum torque requirement among the sensed torque requirements,
calculating a difference between the maximum and the minimum torque requirement, and
comparing the calculated difference to the fault criterion by checking whether the calculated difference exceeds a predetermined difference threshold value.

2. The method of claim 1, further comprising in response to determining that the calculated rotation angle is 45 degrees, checking whether the rotation angle is constant.

3. The method of claim 1, comprising checking the rotation angle data when the calculated difference meets the second criterion.

4. The method of claim 1, wherein the second signal comprises data related to a speed of the synchronous motor based on the obtained rotation angle data.

5. The method of claim 4, further comprising determining a speed of the synchronous motor by:
obtaining first rotation angle data,
waiting for a predetermined first period of time,
obtaining second rotation angle data, and
determining the speed of the synchronous motor based on the first and second rotation angle data and the predetermined first period of time.

6. The method of claim 4, further comprising determining a speed of the synchronous motor twice, by:
obtaining a first speed,
waiting for a predetermined period of time,
obtaining a second speed,
determining a rate of change of speed based on the first and second speeds and the predetermined period of time, and
checking whether the determined rate of change meets the second criterion by checking whether the determined rate of change exceeds a predetermined rate of change threshold value.

7. The method of claim 1, wherein the actual fault comprises a loss of a connection between a rotation angle sensor for obtaining rotation angle data and a ground.

8. A motor arrangement, comprising:
a synchronous motor having a rotor;
a sensor sensing a rotation angle of the rotor and connected to a ground via a line, and
a motor controller configured to detect a loss of the connection between the rotation angle sensor and the ground, the motor controller comprising a processing unit and a non-transitory data memory storing a program executable by the processing unit to:
receive a first signal from the sensor indicating the rotation angle of the rotor,
calculate a rotation angle of the rotor based at least in part on the first signal,
if the calculated rotation angle is 45 degrees, analyzing a second signal for a potential fault in the first signal,
identify the potential fault as an actual fault upon a determination that the second signal meets a fault criterion;
wherein the fault criterion comprises a torque requirement for operation of the synchronous motor; and
if an actual fault is identified, operating the synchronous motor independently of the value of the first signal;
sense a torque requirement at least twice,
determine a maximum and a minimum torque requirement based on the sensed torque requirements,
calculate a difference between the maximum and the minimum torque requirement, and
check whether the calculated difference meets the fault criterion by checking whether the calculated difference exceeds a predetermined difference threshold value.

9. The motor arrangement of claim 8, wherein the program is executable to, in response to determining that the rotation angle is 45 degrees, check whether the rotation angle data are constant.

10. The motor arrangement of claim 8, wherein the program is executable to check whether the rotation angle data meet the first criterion after the calculated difference meets the second criterion.

11. The motor arrangement of claim 8, wherein the second criterion comprises a speed of the synchronous motor determined based on the obtained rotation angle data.

* * * * *